(12) United States Patent
Baba (10) Patent No.: US 12,181,632 B2
(45) Date of Patent: Dec. 31, 2024

(54) IMAGING DEVICE AND IMAGING APPARATUS

(71) Applicant: SONY SEMICONDUCTOR SOLUTIONS CORPORATION, Kanagawa (JP)

(72) Inventor: Tomohiko Baba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 218 days.

(21) Appl. No.: 17/297,020

(22) PCT Filed: Nov. 15, 2019

(86) PCT No.: PCT/JP2019/044927
§ 371 (c)(1),
(2) Date: May 26, 2021

(87) PCT Pub. No.: WO2020/116132
PCT Pub. Date: Jun. 11, 2020

(65) Prior Publication Data
US 2022/0026676 A1 Jan. 27, 2022

(30) Foreign Application Priority Data
Dec. 5, 2018 (JP) .................. 2018-228040

(51) Int. Cl.
*G02B 13/18* (2006.01)
*G02B 9/12* (2006.01)
*G02B 13/00* (2006.01)

(52) U.S. Cl.
CPC ........... *G02B 13/0035* (2013.01); *G02B 9/12* (2013.01)

(58) Field of Classification Search
CPC .............. G02B 9/00; G02B 9/12; G02B 9/14; G02B 9/16; G02B 13/00; G02B 13/001;
(Continued)

(56) References Cited

U.S. PATENT DOCUMENTS 5,760,973 A 6/1998 Kawamura
6,271,975 B1 * 8/2001 Grupp .................... G02B 15/02
359/721

(Continued)

FOREIGN PATENT DOCUMENTS

CN 101874217 A 10/2010
CN 101874217 B 6/2012
(Continued)

OTHER PUBLICATIONS

International Search Report and Written Opinion of PCT Application No. PCT/JP2019/044927, issued on Jan. 7, 2020, 12 pages of ISRWO.

*Primary Examiner* — Thong Q Nguyen
(74) *Attorney, Agent, or Firm* — CHIP LAW GROUP (57) ABSTRACT

In a lens based on one-group configuration, performance is improved, and a wide angle and a low height are achieved. An imaging lens includes first to third lenses. These first to third lenses are sequentially arranged from an object side to an image surface side without sandwiching air. Each surface of the first to third lenses has an aspherical shape. An imaging element is arranged on the image surface side of the imaging lens. A cover glass is attached on an imaging surface of the imaging element without an air gap. Another lens may be arranged between the imaging lens and the imaging element.

8 Claims, 8 Drawing Sheets

(58) Field of Classification Search
CPC .............. G02B 13/0015; G02B 13/002; G02B
13/0035; G02B 13/005; G02B 13/008;
G02B 13/0085; G02B 13/14; G02B
13/143; G02B 13/146; G02B 13/18;
G02B 9/24; G02B 9/26; G02B 9/28;
G02B 9/30; G02B 13/006
USPC .................................. 359/716, 754, 784, 785
See application file for complete search history.

(56) References Cited

U.S. PATENT DOCUMENTS

| | | |
|---|---|---|
| 7,746,574 B2 | 6/2010 | Suzuki et al. |
| 8,149,522 B2 * | 4/2012 | Mihara ................ G02B 13/004 |
| | | 359/716 |
| 8,149,525 B2 * | 4/2012 | Do ....................... G02B 13/006 |
| | | 359/716 |
| 8,305,698 B2 | 11/2012 | Ozaki |
| 8,331,041 B2 | 12/2012 | Katakura et al. |
| 2008/0297920 A1 | 12/2008 | Suzuki et al. |
| 2010/0302652 A1 | 12/2010 | Ozaki |
| 2011/0194019 A1 * | 8/2011 | Shyu .................. G02B 13/0025 |
| | | 348/360 |
| 2012/0133802 A1 | 5/2012 | Katakura et al. |
| 2018/0246297 A1 * | 8/2018 | Amanai ............... G02B 13/006 |
| 2019/0004294 A1 | 1/2019 | Baba |

FOREIGN PATENT DOCUMENTS

| | | |
|---|---|---|
| CN | 102713718 A | 10/2012 |
| CN | 102713718 B | 7/2013 |
| CN | 107924043 A | 4/2018 |
| DE | 19654175 A1 | 7/1997 |
| EP | 2579082 A1 | 4/2013 |
| JP | 9-236746 A | 9/1997 |
| JP | 2008-285377 A | 11/2008 |
| JP | 2011-081102 A | 4/2011 |
| JP | 5006476 B2 | 8/2012 |
| JP | 2017-040743 A | 2/2017 |
| JP | 2017-167253 A | 9/2017 |
| WO | 2009/069467 A1 | 6/2009 |
| WO | 2011/148822 A1 | 12/2011 |
| WO | 2017/029901 A1 | 2/2017 |

* cited by examiner

IMAGING DEVICE AND IMAGING APPARATUS

TECHNICAL FIELD

This application is a U.S. National Phase of International Patent Application No. PCT/JP2019/044927 filed on Nov. 15, 2019, which claims priority benefit of Japanese Patent Application No. JP 2018-228040 filed in the Japan Patent Office on Dec. 5, 2018. Each of the above-referenced applications is hereby incorporated herein by reference in its entirety.

The present technology relates to an imaging device. More specifically, the present technology relates to an imaging device and an imaging apparatus including an imaging lens.

BACKGROUND ART

In recent years, there is a strong demand for high resolution, low cost, and miniaturization of imaging devices mounted in, for example, mobile devices and PCs. Cell pitches of imaging elements such as a CCD and a CMOS have been dramatically reduced. Optical systems are required to have higher image formation performance in which optical aberration, particularly axial chromatic aberration is more inhibited than before. Here, particular attention is paid to small imaging elements for mobile devices and wearable devices. Each of imaging lenses for small imaging apparatuses has been decreased in size. Lens tilt due to burrs generated in the outer peripheral portion of a lens at the time of plastic molding and even small tilt generated at the time of assembly cause significant deterioration of performance. Thus, an imaging lens configured in one group as long as possible by some kind of bonding or stacking is useful. Thus, an optical unit and an imaging apparatus that reduce various aberrations by the one-group configuration have been proposed in one example (e.g., see Patent Document 1).

CITATION LIST

Patent Document

Patent Document 1: Japanese Patent Application Laid-Open No. 2011-081102

PROBLEMS TO BE SOLVED BY THE INVENTION

In the above-described conventional technology, one-group configuration reduces various aberrations. Unfortunately, in the above-described conventional technology, chromatic aberration reduces resolution on an axis, and astigmatism deteriorates resolution in the periphery. Performance is insufficient in terms of, for example, an F-number, a half angle of view, and an optical length.

SUMMARY OF THE INVENTION

The present technology has been made in view of such a situation, and an object thereof is to improve performance and achieve a wide angle and a low height in a lens based on the one-group configuration.

SOLUTIONS TO PROBLEMS

The present technology has been made to solve the above-described problems, and a first aspect thereof relates to an imaging device including: an imaging lens that includes first to third lenses sequentially arranged from an object side to an image surface side without sandwiching air and having each aspherical surface; and an imaging element arranged on an image surface side of the imaging lens, a cover glass being attached on an imaging surface without an air gap. This has an effect of improving the performance of an imaging device and achieving a wide angle and a low height.

Furthermore, in the first aspect, the first lens may be a negative lens, the second lens may be a positive lens, and the third lens may be a negative lens.

Furthermore, in the first aspect, the imaging lens may satisfy Conditional Expression (a) below.

Conditional Expression (a): $-10 \leq R1/f \leq -0.1$

Note, however, that, f represents a focal length of the imaging lens, and R1 represents the curvature radius of a first surface on an object side.

Furthermore, in the first aspect, the imaging lens may satisfy Conditional Expression (b) below.

Conditional Expression (b): $0.05 \leq R2/f \leq 5$

Note, however, that, f represents a focal length of the imaging lens, and R2 represents the curvature radius of a second surface.

Furthermore, in the first aspect, the imaging lens may satisfy Conditional Expression (c) below.

Conditional Expression (c): $-5 \leq R3/f \leq -0.05$

Note, however, that, f represents a focal length of the imaging lens, and R3 represents the curvature radius of a third surface.

Furthermore, in the first aspect, the imaging lens may satisfy Conditional Expression (d) below.

Conditional Expression (d): $1 \leq TT/Ym \leq 3$

Note, however, that Ym represents the maximum image height and TT represents a total optical length. For example, the total optical length (represented by TT or H) is a distance from the surface (first surface) of the first lens on the object side to an imaging surface of the imaging element.

Furthermore, in the first aspect, the cover glass may have a maximum chief ray angle of incident light of more than 35°, and relax an emission angle to the imaging surface by 5° or more by refracting the incident light.

Furthermore, in the first aspect, a fourth lens arranged between the imaging lens and the imaging element with air sandwiched may be further provided.

Furthermore, a second aspect of the present technology relates to an imaging apparatus including: an imaging device including: an imaging lens that includes first to third lenses sequentially arranged from an object side to an image surface side without sandwiching air and having each aspherical surface; and an imaging element arranged on an image surface side of the imaging lens, a cover glass being attached on an imaging surface without an air gap; and a signal processing unit that performs predetermined signal processing on output of the imaging device. This has an effect of improving the performance of an imaging apparatus and achieving a wide angle and a low height.

Furthermore, in the second aspect, the imaging device may have optical distortion throughout an optical system, and the signal processing unit may correct the optical distortion for output of the imaging device.

MODE FOR CARRYING OUT THE INVENTION

Embodiments for carrying out the present technology (hereinafter, referred to as embodiments) will be described below. The description will be given in the following order.
1. First Embodiment (Numerical Example 1)
2. Second Embodiment (Numerical Example 2)
3. Third Embodiment (Numerical Example 3)
4. Application Example (Imaging Apparatus)

The meanings and the like of a sign indicated in each of the following tables and descriptions are as described below. That is, "R" indicates a curvature radius. A sign "d" corresponding to the surface number i indicates an axial surface distance between the i-th surface and the (i+1)-th surface from an object side. A sign "nd" indicates a refractive index of a glass material or a material having a surface on the object side with respect to a d-line (wavelength of 587.6 nm). A sign "vd" indicates the Abbe number of the glass material or the material having the i-th surface on the object side with respect to the d-line. Then, "INFINITY" in relation to the curvature radius indicates that the surface is flat. Furthermore, "STO" in the surface number indicates that the surface serves as an aperture stop. Furthermore, "f" indicates a focal length. A sign "F" indicates an F-number (numerical aperture). A sign "ω" indicates a half angle of view. A sign "H" indicates a total optical length.

Furthermore, some of imaging lenses used in each embodiment have an aspherical lens surface as described above. In a case where a distance (sag quantity) in an optical axis direction from an apex of a lens surface is defined as "x", a height in a direction perpendicular to the optical axis is defined as "y", a paraxial curvature (1/r) at the lens apex is defined as "c", and a conic constant is defined as "K", the following expression is established.

$$x = cy^2 / \left(1 + (1 - (1+K)c^2y^2)^{1/2}\right) + Ay^4 + By^6 + Cy^8 + Dy^{10} + Ey^{12} + Fy^{14} + Gy^{16} + Hy^{18} + Jy^{20}$$

Note that A, B, C, D, E, F, G, H, and J are the 4th, 6th, 8th, 10th, 12th, 14th, 16th, 18th, and 20th order aspherical coefficients, respectively.

The single focus lens is assumed to be used by being mounted on a device as typified by a small imaging apparatus mounted on a small information terminal device such as a mobile phone (including a smartphone), a mobile PC, and a wearable device.

An imaging element such as a charge coupled device (CCD) and a complementary metal oxide semiconductor (CMOS) is assumed to be arranged on the image formation surface of the single focus lens. Furthermore, an optical member may be arranged between the image side surface of an image side lens group and the image formation surface in addition to, for example, a cover glass, an infrared cut filter, and a low-pass filter including resin or glass.

An imaging device of the present disclosure includes: an imaging lens that includes first to third lenses sequentially arranged from an object side to an image surface side without sandwiching air and having each aspherical surface; and an imaging element arranged on an image surface side of the imaging lens, a cover glass being attached on an imaging surface without an air gap. The first to third lenses arranged without sandwiching air as described above can shorten the total optical length.

Furthermore, in the imaging device of the present disclosure, it is assumed that the first lens is a negative lens, the second lens is a positive lens, and the third lens is a negative lens.

Furthermore, in the imaging device of the present disclosure, it is assumed that the imaging lens satisfies Conditional Expressions (a) to (c) below.
Conditional Expression (a): $-10 \leq R1/f \leq -0.1$
Conditional Expression (b): $0.05 \leq R2/f \leq 5$
Conditional Expression (c): $-5 \leq R3/f \leq -0.05$
Note, however, that the followings are defined.
f: Focal length of the imaging lens
R1: Curvature radius of first surface on object side
R2: Curvature radius of second surface
R3: Curvature radius of third surface.

Furthermore, in the imaging device of the present disclosure, it is assumed that the imaging lens satisfies Conditional Expression (d) below.
Conditional Expression (d): $1 \leq TT/Ym \leq 3$
Note, however, that the followings are defined.
Ym: Maximum image height (mm)
TT: Total optical length (mm)

Furthermore, in the imaging device of the present disclosure, it is assumed that the cover glass has a maximum chief ray angle of incident light of more than 35°, and relaxes an emission angle to the imaging surface by 5° or more by refracting the incident light. That is, a large chief ray angle (CRA) of a ray emitted from the imaging lens is relaxed by using refraction of the cover glass. This can achieve a small, low height, bright wide-angle lens.

Furthermore, it is also assumed that the imaging device of the present disclosure further includes a fourth lens arranged between the imaging lens and the imaging element with air sandwiched.

The above-described conditional expressions are common to Numerical Examples 1 to 3 below. Appropriately adopting the conditional expressions as necessary achieves more preferred image formation performance and compact optical system suitable for individual imaging elements or imaging apparatuses.

In the basic configuration of the imaging device of the present disclosure, the first lens, the second lens, and the third lens on the object side constitutes a one-group triplet lens arranged without an air gap. The first lens, the second lens, and the third lens are sequentially arranged from the object side to the image surface side without sandwiching air. The first lens has a biconcave shape. The second lens has a biconvex shape. The third lens has a wavy but substantially biconcave surface shape. The chief ray angle of an emitted ray from the imaging lens is increased from a central portion to a peripheral portion. The imaging element is provided on the image side. The cover glass is attached on the imaging surface of the imaging element without an air gap. A ray emitted from the imaging lens is refracted by the cover glass, and the chief ray angle of the ray is relaxed. The ray is incident on the imaging element, and has desirable optical characteristics. The functions of the conditional expressions will be described below.

Conditional Expression (a) relates to the curvature radius of the first surface on the object side of the first lens on the object side, and represents that the surface has a shape concave to the object side. In order to achieve better camera characteristics in the one-group configuration, it is necessary to make an optical path passing through the lens longer in the periphery than in the center, and to efficiently correct field curvature. The expression is necessary since correction is insufficient at the lower limit and correction is possible at the upper limit.

Conditional Expression (b) relates to the curvature radius of the junction on the object side between the image side of the first lens on the object side and the object side of the second lens. The expression is necessary for efficiently correcting off-axis chromatic aberration. In a normal bonded lens, a convex lens including glass material having a small dispersion and a concave lens including glass material having a large dispersion are bonded together to correct chromatic aberration and improve image formation performance, but the effect is limited to axial characteristics. A higher image height deteriorates the characteristics in reverse. A camera lens is combined with an opposite one to give off-axis characteristics. The difference in dispersion in the case is reduced. Here, if a glass material with large wavelength dispersion and a small Abbe number is provided on a first incident surface on the object side, the effects of the wavelength dispersion is excessively increased, which makes the correction impossible. Thus, a glass material with a large Abbe number is optimally provided on an incident surface. Furthermore, for the reason described in Conditional Expression (a), a glass material having a concave shape and slightly large dispersion is provided on the next surface to form a convex shape and correct off-axis aberration color. The lower limit is specified as a manufacturing limit since the curvature radius is too small and errors have significant influence on performance at the lower limit. The upper limit is set at this value since chromatic aberration is insufficiently corrected at the upper limit, which influences total performance.

Conditional Expression (c) relates to the curvature radius of the junction on the object side between the image side of the second lens on the object side and the object side of the third lens. The expression is necessary for reducing axial chromatic aberration and efficiently correcting field curvature. In a normal bonded lens, a convex lens including glass material having a small dispersion and a concave lens including glass material having a large dispersion are bonded together to correct chromatic aberration and improve image formation performance. A similar method is adopted for the imaging device of the present disclosure. Furthermore, at the same time, the concave third lens makes an optical path passing through the lens longer in the periphery than in the center to correct the field curvature. The lower limit is specified since the curvature is relaxed and the total performance is deteriorated at the lower limit. The upper limit is specified as a manufacturing limit since the curvature radius is too small and errors have significant influence on performance at the upper limit.

Conditional Expression (d) represents the relation between the maximum image height and the total optical length. The lower limit is caused by the fact that aberration is corrected for the reason of negative action of the first lens on the object side and thus there is a limit in shortening the total optical length. The upper limit is caused by the intended use of the imaging device of the present disclosure. A large optical length is not intended since use for a small module is intended. Therefore, the value indicated in Conditional Expression (d) corresponds to the upper limit.

1. First Embodiment

A first embodiment is a numerical example of a CMOS image sensor for HD (1296×816 pixels) of a size of 1/10.49 and a pitch of 1.12 μm.

[Lens Configuration]

Figure 1:
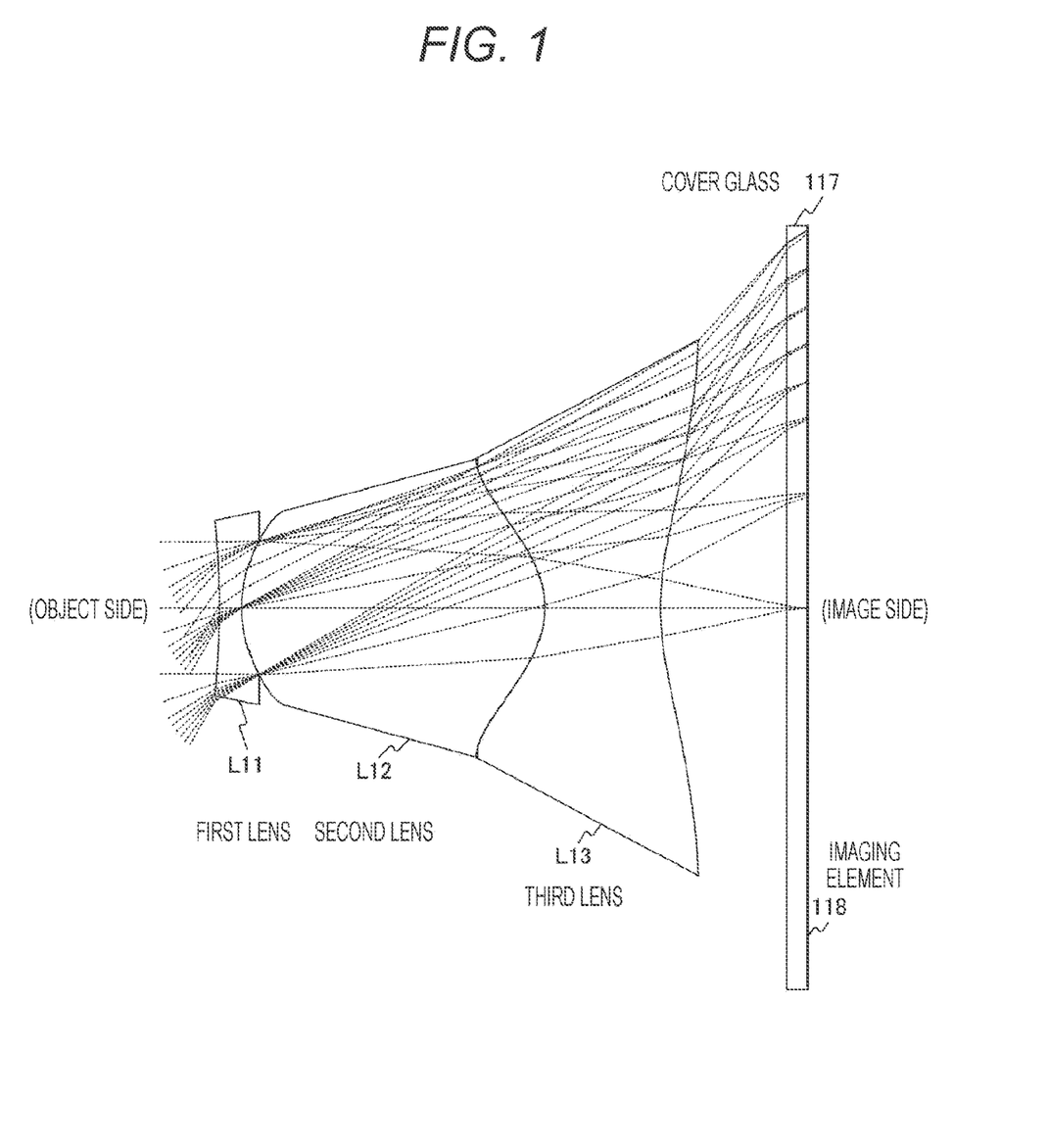
FIG. 1 illustrates the lens configuration of an imaging device in a first embodiment of the present technology.

FIG. 1 illustrates the lens configuration of an imaging device in the first embodiment of the present technology.

The imaging lens in the first embodiment includes a first lens L11, a second lens L12, and a third lens L13 in order from the object side. The first lens L11 has negative refractive power. The second lens L12 has positive refractive power. The third lens L13 has negative refractive power. These first to third lenses (L11 to L13) are arranged without an air gap to form a one-group triplet lens.

Furthermore, the imaging device in the first embodiment includes an imaging element 118 arranged on the image surface side of the imaging lens. A cover glass 117 is attached on the imaging surface of the imaging element 118 without an air gap. The cover glass 117 is a transparent object for protecting the imaging element 118, and is attached on the image surface of the imaging element 118 by an adhesive or a filler without air. This can be achieved by, for example, wafer level chip size package (CSP) technology.

The first lens L11 has a biconcave shape and a vd of 60. The second lens L12 has a biconvex shape and a vd of 49.2. The third lens L13 has a wavy but substantially biconcave surface shape and a vd of 30. The second lens L12 and the third lens L13 correct axial chromatic aberration. Furthermore, the first lens L11 and the second lens L12 correct off-axis chromatic aberration. The first lens L11 and the third lens L13 have a biconcave shape, and the optical path length is increased toward the periphery so that the field curvature aberration is corrected.

The chief ray angle of an emitted ray from the imaging lens is increased from a central portion to a peripheral portion. The imaging element 118 is provided on the image side. The cover glass 117 is attached on the imaging surface of the imaging element 118 without an air gap. A ray emitted from the imaging lens is refracted by the cover glass 117, and the chief ray angle of the ray is relaxed. The ray is incident on the imaging element 118, and has desirable optical characteristics.

Figure 2:
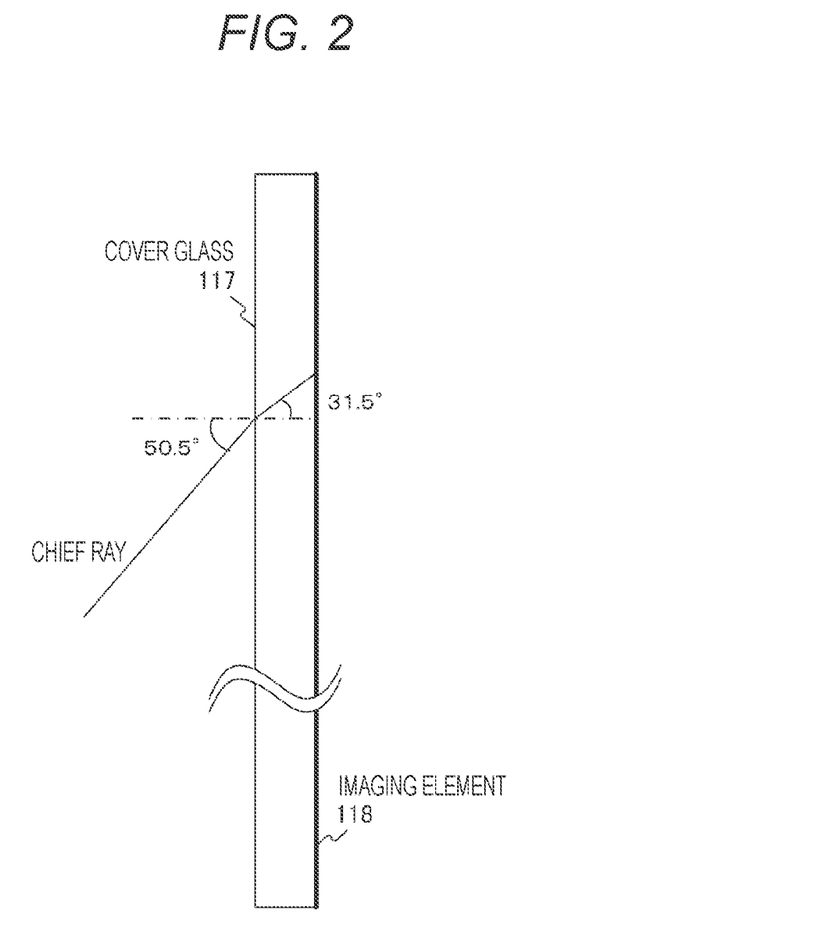
FIG. 2 illustrates a cross-sectional configuration example of a cover glass 117 in the embodiment of the present technology.

FIG. 2 illustrates a cross-sectional configuration example of the cover glass 117 in the embodiment of the present technology.

In the example, it is assumed that a chief ray emitted from the imaging lens has an angle of 50.5° at the portion of the maximum image height. The chief ray emitted from the imaging lens is bent up to 31.5° by refraction of the cover glass 117, and is incident on the imaging element 118. It can be seen that the imaging lens has a noticeably wide total angle of view of 120° and a noticeably short total optical length of 1.35 mm.

If a relative refractive index of the cover glass 117 with respect to air is defined as $n_{CG}$, an incident angle is defined as $R_{in}$, and a refraction angle is defined as $R_{out}$, Snell's law dictates the following relational expression therebetween. Note that the adhesive and the filler have a refractive index comparable to that of the cover glass 117.

$$\sin(R_{in})/\sin(R_{out}) = n_{CG}$$

In the above expression, the refraction angle $R_{out}$ of the cover glass 117 is five degrees or more smaller than the incident angle $R_{in}$. As described above, since the cover glass 117 is attached on the image surface of the imaging element 118, the chief ray refracted at the refraction angle $R_{out}$ in the above expression is incident on the image surface at the angle as it is. Thus, the chief ray maximum incident angle ($=R_{out}$) with respect to the image surface is five degrees or more smaller than the maximum chief ray angle ($=R_{in}$) with respect to the cover glass 117. That is, the refraction of the cover glass 117 relaxes the maximum emission angle ($=R_{in}$) of the chief ray from the imaging lens with respect to the optical axis by five degrees or more. For example, the relative refractive index $n_{CG}$ is approximately 1.5, and the maximum emission angle is relaxed to 32 degrees from the above expression.

The imaging element 118 generates an image signal by photoelectrically converting light received through the imaging lens. The imaging element 118 includes, for example, a CCD and a CMOS. In the imaging element 118, the maximum incident angle at which color mixing between pixels does not occur is considered to be, for example, around 35 degrees even if pupil correction is taken into consideration. As described above, the cover glass 117 relaxes the maximum chief ray emission angle by five degrees or more. Thus, even if a wide-angle imaging lens having a maximum chief ray emission angle of more than 35 degrees with respect to the cover glass 117 is used, the incident angle with respect to the image surface can be inhibited to 35 degrees or less, which is an allowable limit.

[Specification of Imaging Lens]

Table 1 illustrates lens data of Numerical Example 1 in which specific numerical values are applied to the imaging lens in the first embodiment.

TABLE 1

| Surface number | R | d | nd | vd |
|---|---|---|---|---|
| 1 | −1.489 | 0.050 | 1.50 | 60.0 |
| 2 (STO) | 0.258 | 0.696 | 1.77 | 49.2 |
| 3 | −0.204 | 0.266 | 1.50 | 30.0 |

TABLE 1-continued

| Surface number | R | d | nd | vd |
|---|---|---|---|---|
| 4 | 0.645 | 0.289 | — | — |
| 5 | INFINITY | 0.050 | 1.47 | 65.4 |

In the imaging lens of the first embodiment, the surface of the first lens L11 on the object side (first surface), the bonded surface of the first lens L11 and the second lens L12 (second surface), the bonded surface of the second lens L12 and the third lens L13 (third surface), and the surface of the third lens L13 on the image side (fourth surface) are aspherical. Table 2 illustrates a conic constant K, the 4th, 6th, 8th, 10th, 12th, 14th, 16th, 18th, and 20th order aspherical coefficients A, B, C, D, E, F, G, H, and J of these surfaces. Note that, in Table 2 and the following tables illustrating aspherical coefficients, "E-i" represents an exponential notation with a base of 10, that is, "$10^{-i}$". For example, "0.12345E-05" represents "$0.12345 \times 10^{-5}$".

TABLE 2

| Surface number | K<br>E | A<br>F | B<br>G | C<br>H | D<br>J |
|---|---|---|---|---|---|
| 1 | −0.979 | 0.672E+01 | −0.214E+03 | 0.350E+04 | −0.254E+05 |
|   | −0.698E−10 | −0.886E−11 | −0.495E−12 | −0.382E−14 | −0.457E−18 |
| 2 | 0.221 | −0.244E+02 | 0.524E+03 | −0.153E+05 | 0.136E+06 |
|   | 0.521E−10 | 0.145E−11 | — | — | — |
| 3 | −0.995 | 0.774E+01 | 0.131E+02 | 0.346E+02 | −0.161E+03 |
|   | −0.451E−05 | 0.102E−07 | −0.164E−08 | −0.284E−09 | −0.244E−10 |
| 4 | −1.000 | −0.406E+01 | 0.159E+02 | −0.333E+02 | 0.107E+01 |
|   | 0.985E+02 | 0.531E+02 | −0.610E+03 | 0.612E+03 | −0.149195E+01 |

Table 3 illustrates a focal length f, an F-number F, a half angle of view ω, and a total optical length H of the Numerical Example 1.

TABLE 3

| f (Focal length) | 1.1 mm |
|---|---|
| F (Numerical aperture) | 2.5 |
| ω (Half angle of view) | 60.0 deg |
| H (Total optical length) | 1.35 mm |

[Aberration of Imaging Lens]

Figure 3A:
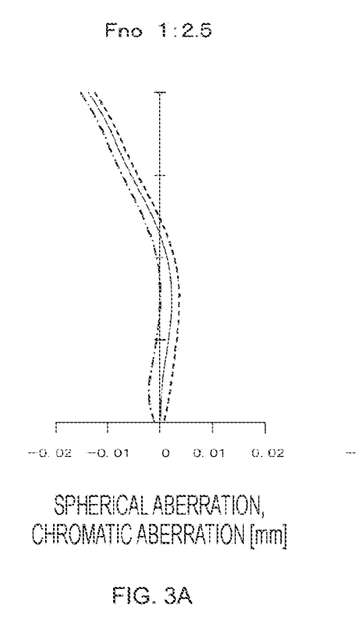
FIGS. 3A, 3B, and 3C illustrate various aberrations of an imaging lens in the first embodiment of the present technology.
Figure 3B:
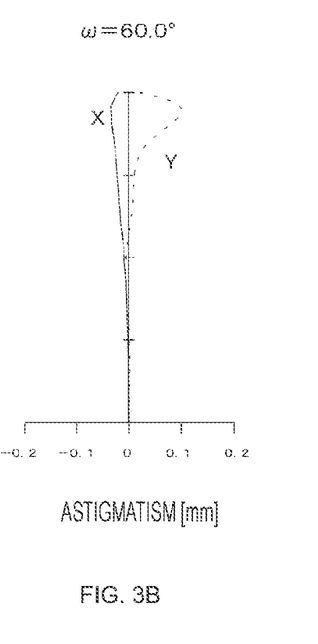
Figure 3C:
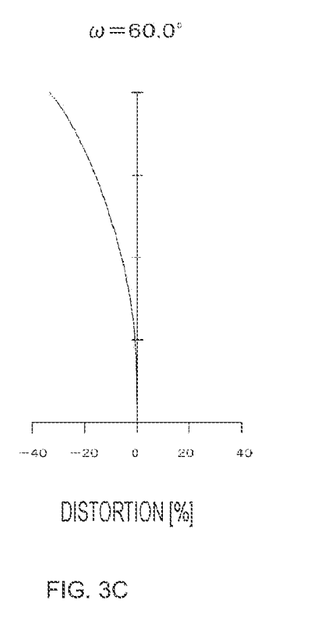

FIGS. 3A, 3B, and 3C illustrate various aberrations of the imaging lens in the first embodiment of the present technology. In the figure, FIG. 3A is a spherical aberration diagram (chromatic aberration diagram), FIG. 3B is an astigmatism diagram (field curvature diagram), and FIG. 3C is a distortion aberration diagram (distortion diagram).

Note that, in the spherical aberration diagram, a dotted line, a solid line, and a dashed line indicate a value at a d-line (wavelength of 587.56 nm), an e-line (wavelength of 546.07 nm), and an Hβ line (wavelength of 486.13 nm), respectively.

Furthermore, in the astigmatism diagram, a solid line (X) indicates a value on a sagittal image surface, and a broken line (Y) indicates a value on a meridional image surface. Furthermore, in the distortion aberration diagram, the solid line indicates a value on the d-line. This is similar to the following spherical aberration diagram, astigmatism diagram, and distortion aberration diagram.

Each aberration diagram clearly indicates that various aberrations are corrected well and excellent image formation performance is exhibited in Numerical Example 1.

2. Second Embodiment

A second embodiment is a numerical example of a CMOS image sensor for full HD (1920×1080 pixels) of a size of ⅐ and a pitch of 1.12 μm.

[Lens Configuration]

Figure 4:
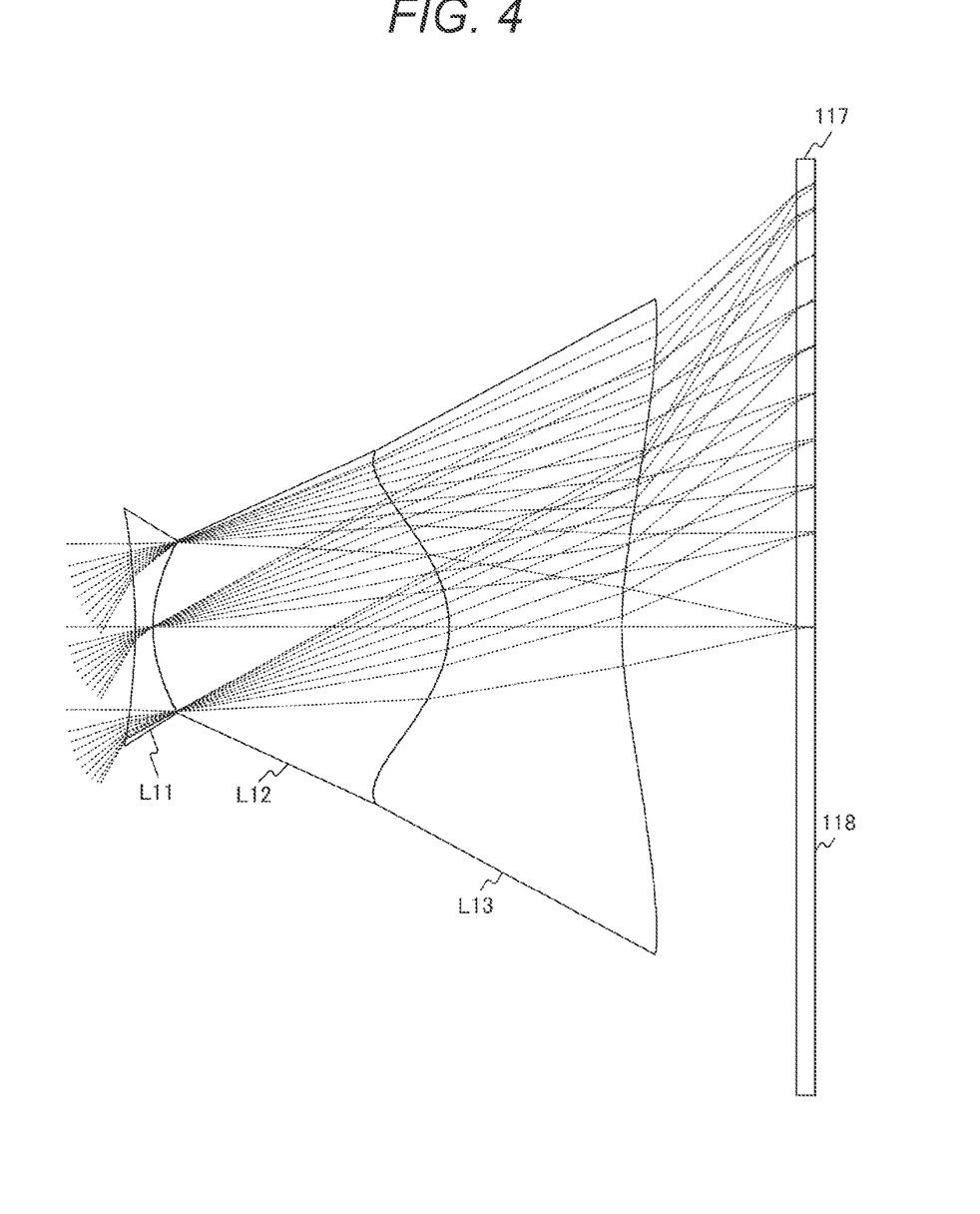
FIG. 4 illustrates the lens configuration of an imaging device in a second embodiment of the present technology.

FIG. 4 illustrates the lens configuration of an imaging device in the second embodiment of the present technology.

In a manner similar to that of the above-described first embodiment, the imaging lens in the second embodiment includes a first lens L11, a second lens L12, and a third lens L13 in order from the object side. The first lens L11 has negative refractive power. The second lens L12 has positive refractive power. The third lens L13 has negative refractive power. These first to third lenses (L11 to L13) are arranged without an air gap to form a one-group triplet lens. Note, however, that the first to third lenses (L11 to L13) have a lens shape different from that in the above-described first embodiment.

The imaging element 118 is provided, and the cover glass 117 is attached on the imaging surface of the imaging element 118 without an air gap. The point is similar to the above-described first embodiment.

[Specification of Imaging Lens]

Table 4 illustrates lens data of Numerical Example 2 in which specific numerical values are applied to the imaging lens in the second embodiment.

TABLE 4

| Surface number | R | d | nd | vd |
|---|---|---|---|---|
| 1 | −1.418 | 0.050 | 1.50 | 60.0 |
| 2 (STO) | 0.364 | 0.828 | 1.77 | 49.2 |
| 3 | −0.315 | 0.484 | 1.50 | 30.0 |
| 4 | 1.258 | 0.488 | — | — |
| 5 | INFINITY | 0.050 | 1.47 | 65.4 |

In a manner similar to that of the above-described first embodiment, in the imaging lens of the second embodiment, the surface of the first lens L11 on the object side (first surface), the bonded surface of the first lens L11 and the second lens L12 (second surface), the bonded surface of the second lens L12 and the third lens L13 (third surface), and the surface of the third lens L13 on the image side (fourth surface) are aspherical. Table 5 illustrates a conic constant K, the 4th, 6th, 8th, 10th, 12th, 14th, 16th, 18th, and 20th order aspherical coefficients A, B, C, D, E, F, G, H, and J of these surfaces.

TABLE 5

| Surface number | K<br>E | A<br>F | B<br>G | C<br>H | D<br>J |
|---|---|---|---|---|---|
| 1 | 0.0117 | 0.332E+01 | −0.568E+02 | 0.477E+03 | −0.159E+04 |
|  | 0.201E−13 | 0.216E−14 | 0.487E−15 | 0.348E−16 | −0.132E−18 |
| 2 | 0.367 | −0.114E+02 | 0.145E+03 | −0.195E+04 | 0.660E+04 |
|  | −0.681E−15 | −0.656E−17 | 0.189E−16 | — | — |
| 3 | −0.815 | 0.273E+01 | −0.243E+01 | 0.405E+02 | −0.345E+02 |
|  | 0.545E−12 | 0.128E−12 | 0.322E−13 | 0.495E−14 | 0.739E−15 |
| 4 | −0.214 | −0.990E+00 | 0.176E+01 | −0.207E+01 | 0.962E+00 |
|  | 0.314E+00 | −0.278E+00 | −0.126E+00 | 0.126E−01 | −0.645E−10 |

Table 6 illustrates a focal length f, an F-number E, a half angle of view ω, and a total optical length H of the Numerical Example 2.

TABLE 6

| f (Focal length) | 1.62 mm |
|---|---|
| F (Numerical aperture) | 2.4 |
| ω (Half angle of view) | 60.0 deg |
| H (Total optical length) | 1.9 mm |

[Aberration of Imaging Lens]

Figure 5A:
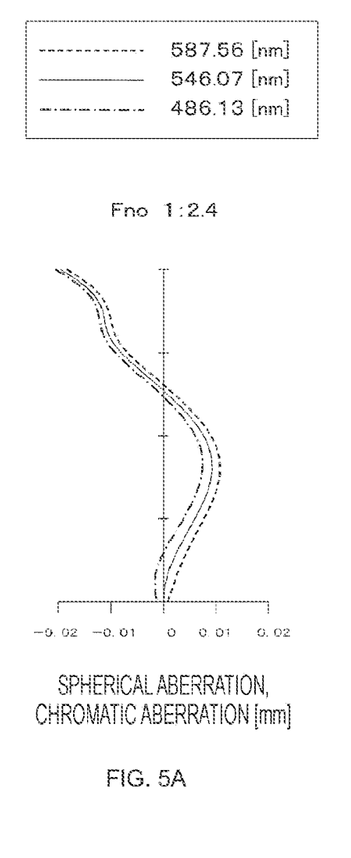
FIGS. 5A, 5B, 5C illustrate various aberrations of an imaging lens in the second embodiment of the present technology.
Figure 5B:
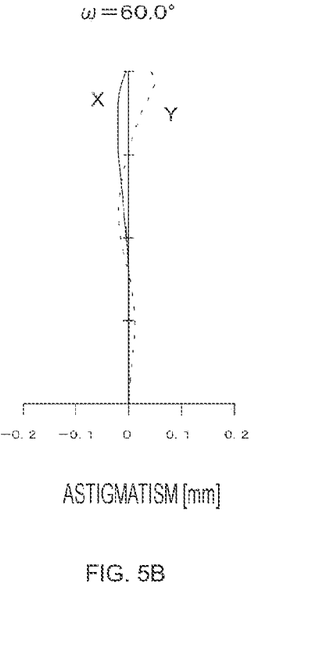
Figure 5C:
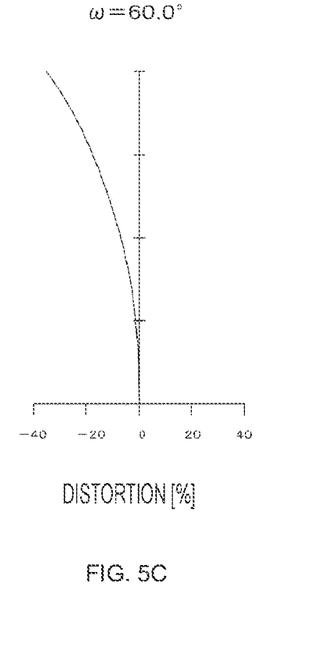

FIGS. 5A, 5B, and 5C illustrate various aberrations of the imaging lens in the second embodiment of the present technology. In the figure, FIG. 5A is a spherical aberration diagram (chromatic aberration diagram), FIG. 5B is an astigmatism diagram (field curvature diagram), and FIG. 5C is a distortion aberration diagram (distortion diagram).

Each aberration diagram clearly indicates that various aberrations are corrected well and excellent image formation performance is exhibited in Numerical Example 2.

3. Third Embodiment

A third embodiment is a numerical example of a CMOS image sensor for 8 M (3264×2448 pixels) of a size of ¼ and a pitch of 1.12 μm.

With the size assumed in the third embodiment, it is difficult to correct aberration over the entire region with a lens of one-group configuration. Thus, in the third embodiment, another independent concave-acting short lens is provided after the three lenses in one group. That is, in order to achieve desired optical characteristics, the size in the range from an extremely small size to approximately ⅕ size or ⅙ size can be configured by only the one-group lens. It is conceivable that configuration in which a lens is further added is useful for a larger size.

[Lens Configuration]

Figure 6:
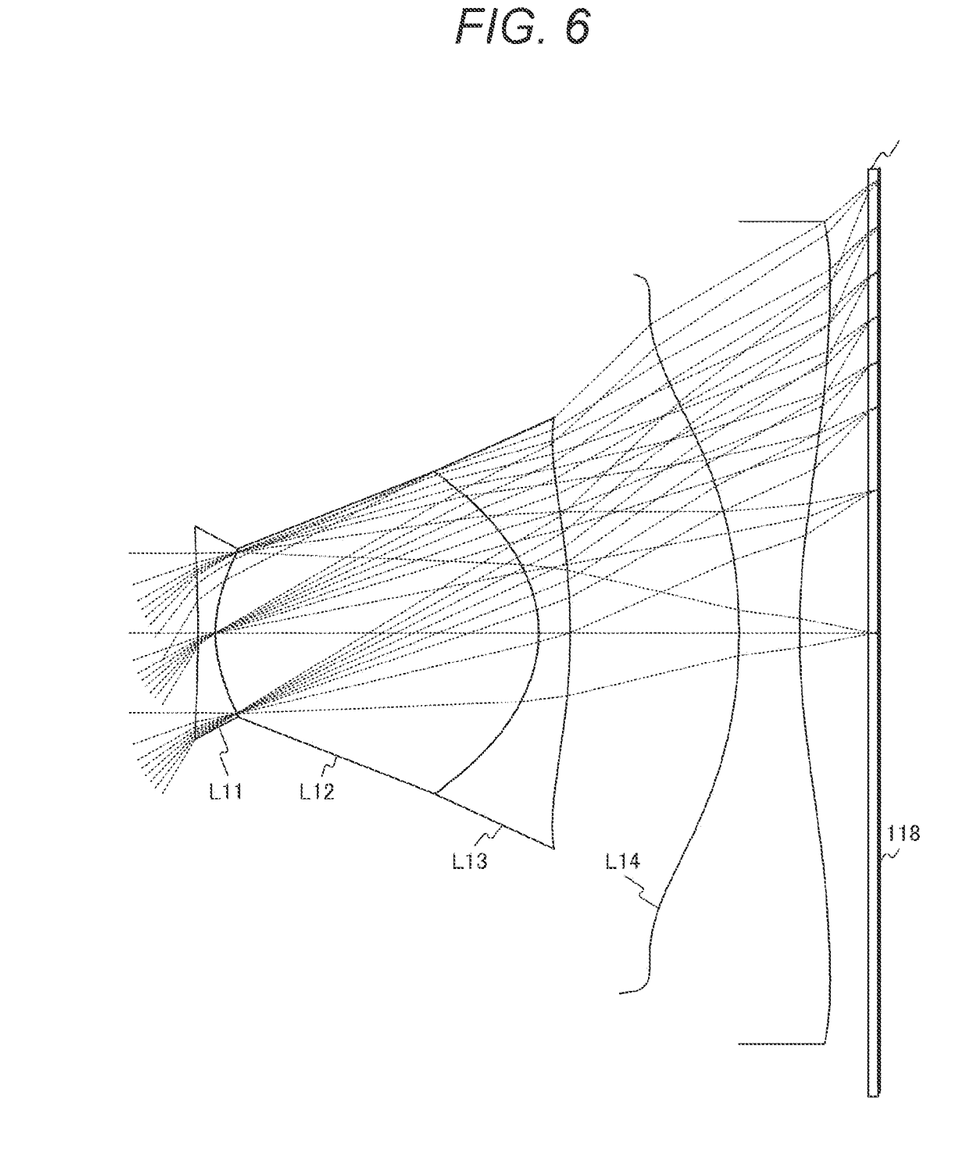
FIG. 6 illustrates the lens configuration of an imaging device in a third embodiment of the present technology.

FIG. 6 illustrates the lens configuration of an imaging device in the third embodiment of the present technology.

In a manner similar to that of the above-described first embodiment, the imaging lens in the third embodiment includes a first lens L11, a second lens L12, and a third lens L13 in order from the object side. The first lens L11 has negative refractive power. The second lens L12 has positive refractive power. The third lens L13 has negative refractive power. These first to third lenses (L11 to L13) are arranged without an air gap to form a one-group triplet lens.

Note, however, that, in the third embodiment, a fourth lens L14 is further provided in addition to the first to third lenses (L11 to L13). The fourth lens L14 is arranged between the imaging lens and the imaging element 118 with air sandwiched. The fourth lens L14 is a biconcave lens having negative refractive power.

The imaging element 118 is provided, and the cover glass 117 is attached on the imaging surface of the imaging element 118 without an air gap. The point is similar to the above-described first embodiment.

[Specification of Imaging Lens]

Table 7 illustrates lens data of Numerical Example 3 in which specific numerical values are applied to the imaging lens in the third embodiment.

TABLE 7

| Surface number | R | d | nd | νd |
| --- | --- | --- | --- | --- |
| 1 | −4.258 | 0.087 | 1.50 | 60.0 |
| 2 (STO) | 0.605 | 1.616 | 1.69 | 53.2 |
| 3 | −0.647 | 0.157 | 1.50 | 30.0 |
| 4 | −3.195 | 0.844 | — | — |
| 5 | −2.530 | 0.300 | 1.51 | 56 |
| 6 | 3.501 | 0.346 | — | — |
| 7 | INFINITY | 0.050 | 1.47 | 65.4 |

In the imaging lens of the third embodiment, the surface of the first lens L11 on the object side (first surface), the bonded surface of the first lens L11 and the second lens L12 (second surface), the bonded surface of the second lens L12 and the third lens L13 (third surface), the surface of the third lens L13 on the image side (fourth surface), and both surfaces of the fourth lens L14 (fifth surface and sixth surface) are aspherical. Table 8 illustrates a conic constant K, the 4th, 6th, 8th, and 10th order aspherical coefficients A, B, C, and D of these surfaces.

TABLE 8

| Surface number | K | A | B | C | D |
| --- | --- | --- | --- | --- | --- |
| 1 | 1.000 | 0.697393E+00 | −0.404942E+01 | 0.121039E+02 | −0.148109E+02 |
| 2 | −0.446 | −0.244974E+01 | 0.132387E+02 | −0.526907E+02 | 0.880575E+02 |
| 3 | −0.849 | 0.150537E+00 | −0.316171E+00 | −0.194175E+00 | 0.567611E+00 |
| 4 | −1.000 | −0.155E−01 | 0.150869E+00 | −0.971847E−01 | 0.292929E−01 |
| 5 | 1.000 | −0.383530E−01 | 0.175608E−01 | 0.733551E−02 | −0.955173E−03 |
| 6 | −0.775 | −0.509376E−01 | 0.719078E−02 | 0.225883E−03 | −0.149326E−03 |

Table 9 illustrates a focal length f, an F-number F, a half angle of view ω, and a total optical length H of the Numerical Example 3.

TABLE 9

| f (Focal length) | 3.05 mm |
| --- | --- |
| F (Numerical aperture) | 2.6 |
| ω (Half angle of view) | 60.0 deg |
| H (Total optical length) | 3.4 mm |

[Aberration of Imaging Lens]

Figures 7A, 7B:
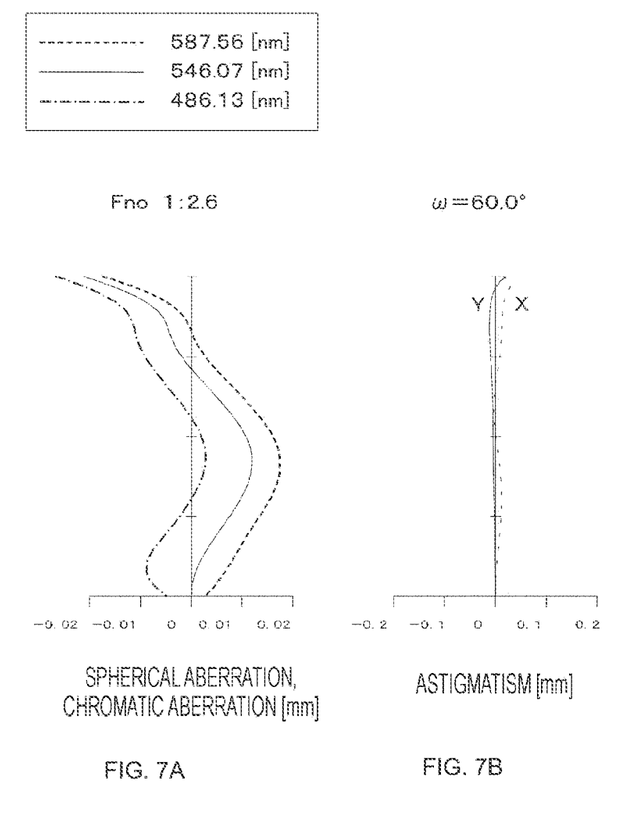
FIGS. 7A, 7B, and 7C illustrate various aberrations of an imaging lens in the third embodiment of the present technology.
Figure 7C:
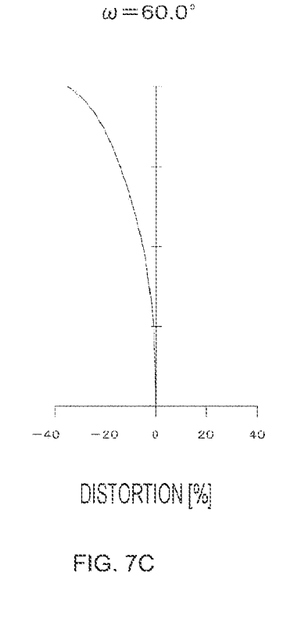

FIGS. 7A, 7B, and 7C illustrate various aberrations of the imaging lens in the third embodiment of the present technology. In the figure, FIG. 7A is a spherical aberration diagram (chromatic aberration diagram), FIG. 7B is an astigmatism diagram (field curvature diagram), and FIG. 7C is a distortion aberration diagram (distortion diagram).

Each aberration diagram clearly indicates that various aberrations are corrected well and excellent image formation performance is exhibited in Numerical Example 3.

[Conclusion of Conditional Expressions]

Table 10 indicates values in Numerical Examples 1 to 3 of the first to third embodiments. As is clear from the values, it can be seen that the Conditional Expressions (a) to (d) are satisfied. Furthermore, as illustrated in each aberration diagram, it can be seen that various aberrations are also corrected in a well-balanced manner at a wide-angle end and a telephoto end.

TABLE 10

| Conditional expression | Example 1 | Example 2 | Example 3 |
| --- | --- | --- | --- |
| (a): R1/f | −1.353 | −0.874 | −1.397 |
| (b): R2/f | 0.235 | 0.224 | 0.199 |
| (c): R3/f | −0.185 | −0.194 | −0.212 |
| (d): TT/Ym | 1.570 | 1.538 | 1.518 |

4. Application Example

[Configuration of Imaging Apparatus]

Figure 8:
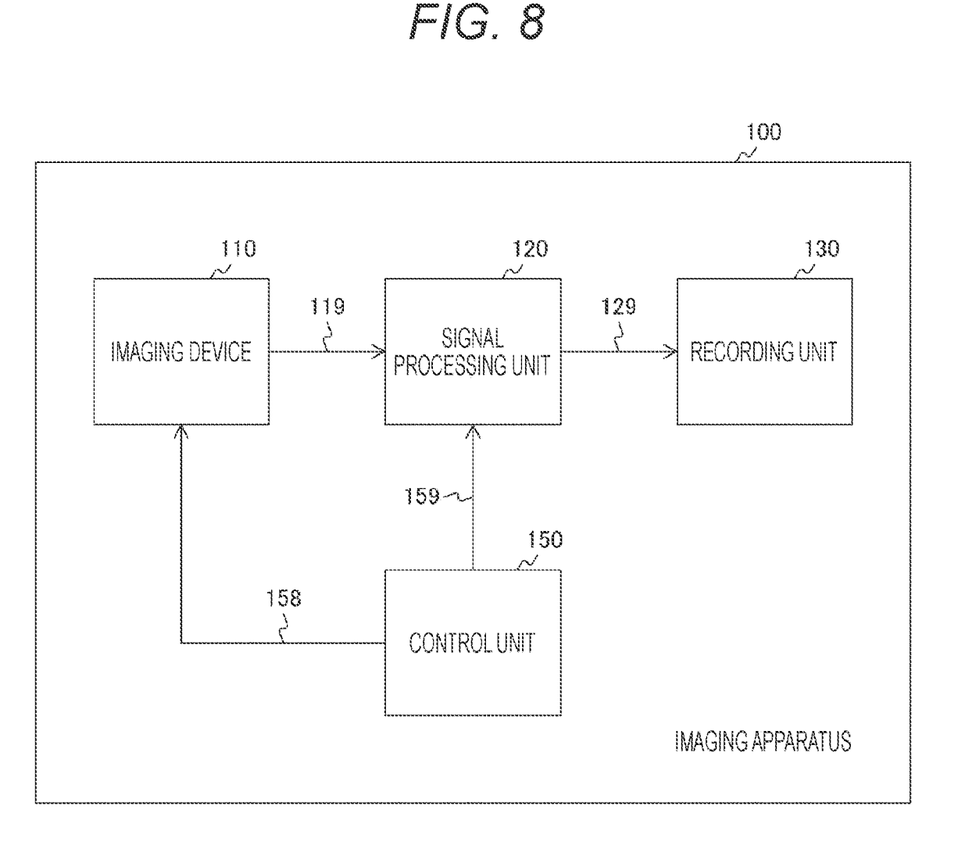
FIG. 8 illustrates an example in which the imaging lens according to the first to third embodiments of the present technology is applied to an imaging apparatus 100.

FIG. 8 illustrates an example in which the imaging lens according to the first to third embodiments of the present technology is applied to an imaging apparatus 100. For example, a mobile phone (including a smartphone), a mobile personal computer (PC), a wearable device, a scanner, a surveillance camera, an ActionCam, a video camera, and a digital camera are assumed as the imaging apparatus 100. The imaging apparatus 100 includes an imaging device 110, a signal processing unit 120, a recording unit 130, and a control unit 150.

The imaging device 110 has an imaging function, and includes an imaging lens according to the first to third embodiments and the imaging element 118 that converts an optical image formed by the imaging lens into an electrical signal. The imaging device 110 can cause image distortion due to optical distortion throughout an optical system. An image signal obtained by the imaging device 110 is supplied to the signal processing unit 120 via a signal line 119.

The signal processing unit 120 performs signal processing such analog-to-digital conversion on the image signal obtained by the imaging device 110. The signal processing unit 120 converts an output signal from the imaging element 118 into a digital signal. Furthermore, the signal processing unit 120 performs various pieces of signal processing such as noise removal, image quality correction, and conversion into a luminance/color difference signal. For example, optical distortion correction is performed on the output of the imaging device 110 as the signal processing. The image signal on which signal processing is performed by the signal processing unit 120 is supplied to the recording unit 130 via a signal line 129.

The recording unit 130 records the image signal supplied from the signal processing unit 120 in a recording medium.

The control unit 150 controls each unit of the imaging apparatus 100. The control unit 150 controls the imaging device 110 in accordance with, for example, user operation, and causes the imaging device 110 to capture an image. Furthermore, the control unit 150 controls the signal processing unit 120, and causes the signal processing unit 120 to perform signal processing in synchronization with image capturing. A control signal from the control unit 150 is supplied to the signal processing unit 120 and the imaging device 110 via the signal line 159 and a signal line 158.

Note that the imaging apparatus 100 may further include a display unit, and display a captured image on the display unit. Furthermore, the imaging apparatus 100 may further include an interface, and transmit an image signal to an external apparatus via the interface.

As described above, in the embodiments of the present technology, the first to third aspherical lenses (L11 to L13) and the imaging element 118 can improve performance, and achieve a wide angle and a low height. The first to third aspherical lenses are attached to each other without an air gap. The cover glass 117 is attached on the imaging element 118.

That is, there can be provided a one-group lens camera having high resolution and sensitivity, a noticeably wide angle of the entire angle of view of 120°, and a total optical length of approximately 1 to 2 mm. Furthermore, the one-group configuration eliminates the need to assemble the lenses individually, and eliminates lens factors such as tilt due to burrs, eccentricity due to uneven lens diameter, and tilt due to clogging in a barrel, resulting in good productivity. Furthermore, there is no need to assemble lenses or diaphragms, and there are less error factors. Furthermore, the biconcave first and third lenses make an optical path passing through the lens longer in the periphery than in the center to efficiently correct field curvature. Furthermore, since the lens configuration starts from a negative group, the peripheral light quantity slowly decreases in accordance with the cosine fourth law, which is advantageous for the peripheral light quantity. Furthermore, there are only two interfaces between a lens and air, which have different refractive indexes. There are less reflection (ghost) factors. Only two coats e required. Furthermore, adopting the optical system on the premise of distortion correction allow design with high resolution. Furthermore, an imaging lens having a large emission angle can be well used by using refraction of the cover glass 117 attached in front of the imaging element 118.

Note that the above-described embodiments are examples for embodying the present technology, and the matter in the embodiments and the invention specifying matter in the claims have a corresponding relation. Similarly, the invention specifying matter in the claims and the matter in the embodiments of the present technology having the same name as this matter have a corresponding relation. Note, however, that the present technology is not limited to the embodiments, and can be embodied by making various modifications to the embodiments without departing from the spirit thereof.

Note that the effects described herein are merely illustrations and not limitations, and other effects may be exhibited.

REFERENCE SIGNS LIST

100 Imaging apparatus
110 Imaging device
L11 First lens
L12 Second lens
L13 Third lens
L14 Fourth lens
117 Cover glass
118 Imaging element
120 Signal processing unit
130 Recording unit
150 Control unit

The invention claimed is:

1. An imaging device, comprising:
   an imaging lens that includes a first lens, a second lens, and a third lens sequentially arranged from an object side to an image side without sandwiching air between the first lens, the second lens, and the third lens, wherein
      the first lens and the third lens both have a biconcave shape,
      an optical path of light at a periphery of the imaging lens is longer than an optical path of the light at a center of the imaging lens based on the biconcave shape of each of the first lens and the third lens, and
      each of a bonded surface of the first lens and the second lens and a bonded surface of the second lens and the third lens has an aspherical surface;
   an imaging element on the image side of the imaging lens; and
   a cover glass attached on an imaging surface of the imaging element without an air gap between the imaging element and the cover glass.

2. The imaging device according to claim 1, wherein the first lens is a negative lens, the second lens is a positive lens, and the third lens is a negative lens.

3. The imaging device according to claim 1, wherein the imaging lens satisfies Conditional Expression (a) below,
   Conditional Expression (a): $-10 \leq R1/f \leq -0.1$,
   wherein
      f: Focal length of the imaging lens,
      R1: Curvature radius of a first surface, and
      the first surface is a surface of the first lens on the object side.

4. The imaging device according to claim 1, wherein the imaging lens satisfies Conditional Expression (b) below,
   Conditional Expression (b): $0.05 \leq R2/f \leq 5$,
   wherein
      f: Focal length of the imaging lens,
      R2: Curvature radius of a second surface, and
      the second surface is the bonded surface of the first lens and the second lens.

5. The imaging device according to claim 1, wherein the imaging lens satisfies Conditional Expression (c) below,
   Conditional Expression (c): $-5 \leq R3/f \leq -0.05$,
   wherein
      f: Focal length of the imaging lens,
      R3: Curvature radius of a third surface, and
      the third surface is the bonded surface of the second lens and the third lens.

6. The imaging device according to claim 1, wherein
   the cover glass has a maximum chief ray angle of an incident light of more than 35°, and
   the cover glass is configured to relax an emission angle to the imaging surface by 5° or more by refraction of the incident light.

7. The imaging device according to claim 1, further comprising: a fourth lens between the imaging lens and the cover glass with air sandwiched between the fourth lens and the imaging lens.

8. An imaging device, comprising:
   an imaging lens that includes a first lens, a second lens, and a third lens sequentially arranged from an object side to an image side without sandwiching air between the first lens, the second lens, and the third lens, wherein
      each of a bonded surface of the first lens and the second lens and a bonded surface of the second lens and the third lens has an aspherical surface, and the imaging lens satisfies Conditional Expression (a) below, Conditional Expression (a): $-10 \leq R1/f \leq -0.1$, wherein f: focal length of the imaging lens, R1: curvature radius of a first surface, and the first surface is a surface of the first lens on the object side;

an imaging element on the image side of the imaging lens; and a cover glass attached on an imaging surface of the imaging element without an air gap between the imaging element and the cover glass.

\* \* \* \* \*